UNITED STATES PATENT OFFICE.

LOUIS ENRICHT, OF NEW YORK, N. Y., ASSIGNOR TO THE ENRICHT MANUFACTURING COMPANY, OF SAME PLACE.

ARTIFICIAL STONE.

SPECIFICATION forming part of Letters Patent No. 449,152, dated March 31, 1891.

Application filed May 15, 1890. Serial No. 351,959. (No specimens.)

*To all whom it may concern:*

Be it known that I, LOUIS ENRICHT, a citizen of the United States, residing at New York, in the county and State of New York, have invented new and useful Improvements in Artificial Stones, of which the following is a specification.

This invention relates to a composition of matter serviceable in making artificial stone, as set forth in the following specification and claim.

The composition consists of the following ingredients, combined in the proportions stated: magnesium oxide, twelve ounces; oxide of calcium, twelve ounces; aqueous solution of magnesium chloride, 35° Baumé, ten ounces; aqueous solution of sodium silicate, 20° Baumé, one ounce.

In place of the aqueous solutions of the magnesium chloride and of sodium silicate I can use these substances in a dry state, and after mixing them with magnesium oxide and lime enough water is added to form a mixture of the proper consistency. When the water is added to the substances in the dry state, the following proportion will yield a good result: magnesium oxide, twelve ounces; oxide of calcium, twelve ounces; magnesium chloride, six ounces; sodium silicate, one-half ounce. To this mixture are added from eight to nine ounces of water. As the sodium silicate is not so soluble in cold water as in heated water, the water may be heated to obtain the required solution; but cold water can be used, if desired, enough time being then allowed for the sodium silicate to dissolve. When the substances are thoroughly mixed by stirring or agitation, a plastic mass is produced, which can be readily pressed into the required form. In the ordinary temperature it sets in about six hours and becomes hard in about twenty-four hours. After it has hardened it resists water, and it can be heated to a red heat without danger that it will crumble into dust.

What I claim as new, and desire to secure by Letters Patent, is—

The herein-described composition of matter, which consists of magnesium oxide, calcium oxide, (lime,) magnesium chloride, sodium silicate, and water.

In testimony whereof I have hereunto set my hand in the presence of two subscribing witnesses.

LOUIS ENRICHT.

Witnesses:
WM. C. HAUFF,
E. F. KASTENHUBER.